United States Patent
Nagarajan

(10) Patent No.: US 7,877,016 B2
(45) Date of Patent: Jan. 25, 2011

(54) PHOTONIC INTEGRATED CIRCUIT (PIC) TRANSCEIVERS FOR AN OPTICAL LINE TERMINAL (OLT) AND AN OPTICAL NETWORK UNIT (ONU) IN PASSIVE OPTICAL NETWORKS (PONS)

(75) Inventor: Radhakrishnan L. Nagarajan, Cupertino, CA (US)

(73) Assignee: Infinera Corporation, Sunnyvale, CA (US)

( * ) Notice: Subject to any disclaimer, the term of this patent is extended or adjusted under 35 U.S.C. 154(b) by 552 days.

(21) Appl. No.: 11/253,776

(22) Filed: Oct. 19, 2005

(65) Prior Publication Data

US 2006/0093369 A1      May 4, 2006

Related U.S. Application Data

(60) Provisional application No. 60/623,025, filed on Oct. 28, 2004.

(51) Int. Cl.
*H04B 10/00*      (2006.01)

(52) U.S. Cl. ............... 398/138; 398/135; 398/139; 398/67; 398/164

(58) Field of Classification Search ............ 398/135, 398/33, 136, 138, 139, 164; 372/94, 72, 372/83, 38.06
See application file for complete search history.

(56) References Cited

U.S. PATENT DOCUMENTS

| | | | |
|---|---|---|---|
| 4,484,794 A | | 11/1984 | Whitte |
| 5,031,188 A | | 7/1991 | Koch et al. |
| 5,101,469 A | | 3/1992 | Oda |
| 5,144,637 A | * | 9/1992 | Koch et al. ............ 372/50.21 |
| 5,235,570 A | * | 8/1993 | Kurtz et al. ............ 369/13.31 |
| 5,252,839 A | * | 10/1993 | Fouquet ............... 257/13 |
| 5,288,659 A | | 2/1994 | Koch et al. |
| 5,347,601 A | | 9/1994 | Ade et al. |
| 5,428,695 A | | 6/1995 | Ohta |
| 5,515,195 A | | 5/1996 | McAdams |
| 5,577,138 A | | 11/1996 | Chandrasekhar et al. |
| 5,577,139 A | | 11/1996 | Chandrasekhar et al. |

(Continued)

FOREIGN PATENT DOCUMENTS

WO      WO 01/84199 A2      11/2001

(Continued)

OTHER PUBLICATIONS

Jeff Hecht, "Understanding Fiber Optics", pp. 292-299, Prentice Hall 1999.

(Continued)

*Primary Examiner*—Ken N Vanderpuye
*Assistant Examiner*—Hibret A Woldekidan
(74) *Attorney, Agent, or Firm*—W. Douglas Carothers, Jr.; David L. Soltz

(57) ABSTRACT

A photonic integrated circuit (PIC) for a PON transceiver comprises a single monolithic chip having a modulated transmitter laser diode of a first wavelength, $\lambda_1$, for generating a first communication signal outgoing from the chip via an input/output port and a receiving photodetector for receiving a second communication signal of a second wavelength, $\lambda_2$, onto chip incoming from the input/output port and a monitoring photodetector for receiving a portion of the first communication signal to monitor the laser diode output power.

12 Claims, 7 Drawing Sheets

U.S. PATENT DOCUMENTS

| | | | |
|---|---|---|---|
| 5,689,597 A * | 11/1997 | Besse | 385/39 |
| 5,712,864 A * | 1/1998 | Goldstein et al. | 372/50.21 |
| 5,787,215 A * | 7/1998 | Kuhara et al. | 385/88 |
| 5,793,789 A * | 8/1998 | Ben-Michael et al. | 372/50.21 |
| 5,796,883 A * | 8/1998 | Hamamoto et al. | 385/14 |
| 5,909,294 A * | 6/1999 | Doerr et al. | 385/49 |
| 6,118,565 A | 9/2000 | Frigo | |
| 6,148,015 A | 11/2000 | Jacquet et al. | |
| 6,208,794 B1 | 3/2001 | Mallecot et al. | |
| 6,545,290 B2 * | 4/2003 | Lorin et al. | 257/40 |
| 6,577,414 B1 | 6/2003 | Feldman et al. | |
| 6,580,844 B2 | 6/2003 | Leuthold | |
| 6,606,430 B2 | 8/2003 | Bartur et al. | |
| 6,684,012 B2 * | 1/2004 | Kimura | 385/49 |
| 6,700,903 B1 | 3/2004 | Boyd et al. | |
| 6,714,566 B1 * | 3/2004 | Coldren et al. | 372/20 |
| 7,027,677 B2 * | 4/2006 | Li et al. | 385/14 |
| 7,142,343 B2 * | 11/2006 | Kim et al. | 359/245 |
| 2003/0166263 A1 * | 9/2003 | Haushalter et al. | 435/287.2 |
| 2003/0174950 A1 | 9/2003 | Lam et al. | |
| 2004/0033004 A1 | 2/2004 | Welch et al. | |
| 2004/0264516 A1 | 12/2004 | Mallecot et al. | |

FOREIGN PATENT DOCUMENTS

WO    WO 2005/012972 A1    2/2005

OTHER PUBLICATIONS

Kaminow & Koch, "Optical Fiber Telecommunications IIIB", pp. 177-179, Academic Press 1997.

Ramaswami & Sivarajan, "Optical Networks—A Practical perspective", pp. 107-111, Academic Press 2002.

* cited by examiner

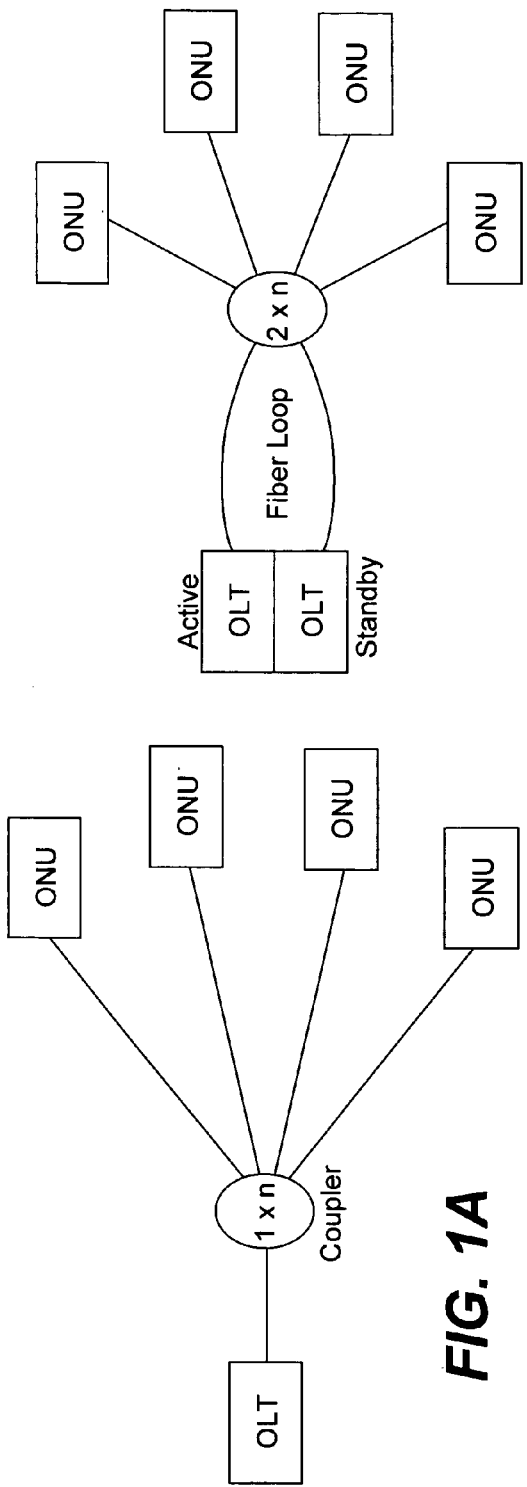
FIG. 1A
FIG. 1C
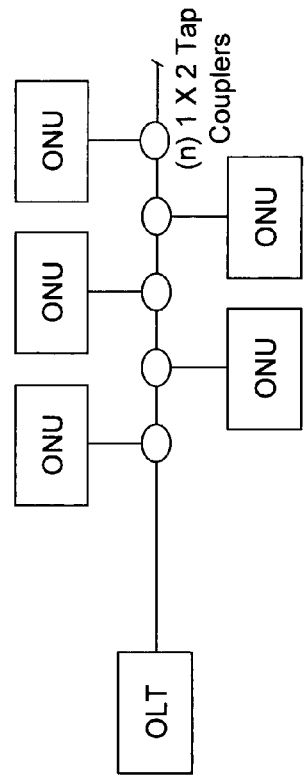
FIG. 1B

PHOTONIC INTEGRATED CIRCUIT (PIC) TRANSCEIVERS FOR AN OPTICAL LINE TERMINAL (OLT) AND AN OPTICAL NETWORK UNIT (ONU) IN PASSIVE OPTICAL NETWORKS (PONS)

REFERENCE TO RELATED APPLICATION

This application claims priority of U.S. provisional patent application, Ser. No. 60/623,025, filed Oct. 28, 2004, which application is incorporated herein by its reference.

BACKGROUND OF THE INVENTION

1. Field of the Invention

This invention relates generally to passive optical networks or PONs and more particularly to transmitter/receiver photonic integrated circuits (PICs) for optical line terminals (OLTs) or optical network units (ONUs) in passive optical network (PONs).

2. Description of the Related Art

A still most common manner of communication with residential customers is common twisted-pair telephone lines used for telephony and internet access such as via DSL or dialup modem. Increasingly, there is a need for high bandwidth data links to residential as well as commercial customers and optical fiber distribution networks are the networks of choice. Extending communication fibers to these customer locations would relieve the bandwidth bottleneck but that 'last mile' is an expensive endeavor to extend communication fiber-to-the-home or FTTH, also referred to as a fiber-to-the-premise or FTTP. A major architecture for FTTH is the deployment of passive optical networks or PONs which provided optical feed from a central office or optical line terminal (OLT), and includes an optical transmitter/receiver or transceiver, to a number of optical network terminals (ONTs) that each include an optical transmitter/receiver or transceiver commonly referred to as an optical network unit (ONU). Such ONUs may include more than one such transmitter. The network between the an OLT and ONUs is nothing but optical communication fiber, optical splitters, waveguide routers and/or filters at intermediate network nodes of a PON—all optical passive components or elements and, hence, the designation, passive optical network or PON. PONs are distinguished from an active optical network (AON) in that the latter have active nodes that can include repeaters or optical to electrical to optical (OEO) converters that is accomplished with active or electrically power driven components or elements. In principal, there is no such power driven elements in a PON. Thus, PONs have been developed to eliminate the need of active elements and therefore provides a significant cost difference from the deployment of AONs. PONs are also called BIDI communication links or bidirectional optical links. Thus, the PON is designed principally for two-way or bidirectional communication between a central location or OLT and a number of subscribers having FTTP, each with an ONT including an ONU.

PONs can be configured in various examples of different PON architectural configurations are shown in FIGS. 1A-1D. These and other such PON configurations are shown in Chapter 10, Optical Access Networks, of the text book entitled, "*Optical Fiber Telecommunications IVB Systems and Impairments*", edited by Ivan P. Kaminow et al., 2002. FIG. 1A illustrates a basic tree PON comprises an optical splitter, such as a 1×n coupler, for coupling the optical line or bus from the OLT to a plurality of ONUs. FIG. 1B illustrates a bus PON comprising a plurality of n 1×2 couplers coupled to the OLT bus and each respective coupler is coupled to an ONU. FIG. 1C is a trunk protected tree PON which comprises an OLT that has two units, one that is active and the other is on standby which is both optically coupled to via separate optical spans to an optical splitter, such as a 2×n coupler, for optical coupling both OLT lines to a plurality of ONUs. It can readily be seen that if there is a failure of communication with one OLT, the other OLT can automatically be activated to perform transmit and receive functions in the PON. FIG. 1D illustrates a fully redundant tree PON which comprises not only redundant OLTs but also redundant ONUs which have two units, here marked L and R, where the L-ONUs at each premise are coupled to a first 1×n coupler and corresponding or paired R-ONUs at each premise are coupled to a second 1×n coupler. The first and second couplers are, in turn, optically coupled, respectively, to an L-OLT and an R-OLT. In the case here, all premise subscribers are fully protected in receiving or transmitting communication with an OLT if either one of such paired units or terminals cease to operate. Lastly, FIG. 1E illustrates a fully redundant bus PON which comprises, again as in FIG. 1D, redundant L- and R-OLTs and L- and R-ONUs but only one optical bus or line is required from the OLTs as a fiber loop, rather than two separate buses or lines coupled to separate couplers, which, in turn, are then coupled to one of the paired ONUs. Thus, there are n 2×2 couplers in the fiber loop for each paired L and R ONUs at a premise. While redundancy may be considered extravagate for a PON designed to be the least expensive as possible, the costs of the OLTs and ONUs can be also be driven by low life expectancy so that inexpensive short life units or terminals may be designed and manufactured at lower costs to significantly offset costs attributed to the deployment in a PON of paired or two units at the premises or two terminals at the central office. It should be also noted that the photodetectors being fairly broadband, a wavelength-sensitive passive splitter can be deployed in PONs to direct traffic from one or more OLTs to several nodes, each node having a group of ONUs.

A typical OLT transceiver comprises a 1.5 µm transmitter using, for example, a 1490 nm direct modulated semiconductor laser and has a 1.3 µm receiver using, for example, a 1310 nm photodetector (such as a PIN or APD type), both of which are coupled to a WDM coupler to an input/output access to the PON. The OLT also includes a video amplifier for supplying gain to video signals which is WDM coupled to the input/output access point of the OLT. The typical ONT includes an input/output access to the PON with a WDM coupler coupled to a 1.5 µm receiver, using for example, a 1490 nm photodetector (such as a PIN or APD type) and a 1.3 µm transmitter using, for example, a 1310 nm direct modulated semiconductor laser (DML). The WDM coupler is also coupled to an RF amplifier to receive a video signal. The standard ONT may include many different subassemblies from different vendors, such as a laser module, a photodetector module, a TO-can package, a transimpedance amplifier (TIA) IC chip, a bidirectional optical subassembly or BOSA assembly, and a transceiver assembly along with a limiting amplifier chip and a laser driver chip.

This invention is directed to the design and manufacture of transceivers for OLTs or ONUs, particularly ONUs, which are monolithically integrated on a single semiconductor substrate. This is not to say that such monolithic ONUs are not already known in the art. For example, U.S. Pat. No. 5,796,883 discloses one type of approach for an optical integrated circuit or photonic integrated circuit (PIC) that may be employed as a transceiver in an ONU. The disclosed PIC chip comprises InP-based chip that includes, in monolithic form, a circuit input/output that may have spot size convert, coupled via a 3 dB coupler to both a receiver photodetector (R-PD) at 1.5 µm and to a DFB laser diode (LD) at 1.3 µm. Also, a 1.3 back facet monitoring photodetector (BF-MPD) is integrated with the LD to monitor its output power. Thus, this transceiver functions as an ONU by receiving, for example, 1550 nm optical signals for conversion into electrical signals and transmitting 1310 optical signals for communication with an OLT in a PON. In further embodiments of the disclosure, the chip may be designed to receive both 1310 nm and 1550 nm signals separated via a directional coupler as well as transmit a 1310 nm signal through the same coupler. In this case, it is further suggested that the R-PD and the BF-MPD have an active region bandgap a little larger than the received 1.3 µm signal and the 1.3 µm LD active region bandgap, such as a bandgap at 1.35 µm, so as to improve the absorption efficiency of 1.3 µm light in either photodetector and, therefore, improve their performance.

U.S. Pat. No. 5,031,188 to Koch illustrates another type of approach for a PIC chip that may also be employed as in a transceiver in an ONU. In the approach here, there is no coupler at the chip input but rather a single longitudinal 1.3 µm bandgap waveguide which waveguide forms an inline integrated element train comprising at the chip output a 1.3 µm bandgap DFB or DBR LD at the chip input and used for generating and transmitting a direct modulated 1310 nm signal to the chip output, an intermediate positioned absorber to absorb 1310 nm back reflections from the LD so as not to be detected by a backend photodetector, and a backend receiver photodetector (R-PD) for receiving and detecting a modulated 1550 nm signal received at the chip input. Also, further embodiments utilize an electrical isolation region between the absorber and the R-PD so that there is no electrical parasitic interference between the LD and R-PD. Since the received 1550 nm signal is a longer wavelength than 1.3 µm bandgap waveguide that includes the initial LD in the train of elements and produces a signal wavelength at 1310 nm, the longer wavelength 1550 nm signal will not be generally absorbed by either the LD or absorber but will be absorbed at the negatively biased backend R-PD. Therefore, all these elements can be integrated within an inline waveguide as illustrated in the embodiments of the patent.

A companion patent to the '188 patent, U.S. Pat. No. 5,144,637 to Koch discloses a transceiver that may be utilized in the OLT. In this disclosure compared to the '188 patent disclosure, the inline waveguide is still a 1.3 µm bandgap layer but the LD includes a coupled 1.5 µm bandgap active region evanescently coupled to the inline waveguide and, further, the inline positions of the R-PD and the 1.5 µm LD are reversed. In this way, an incoming modulated 1.3 µm wavelength is immediately detected at the initial R-PD element at the chip input/output and a modulated 1.5 µm wavelength signal from the direct modulated backend LD is transparent to the inline waveguide and the 1.5 µm signal is transmitted out of the input/output of the chip. Also, disclosed are means for electrical isolation between the R-PD and the LD for the reasons previously stated as well the additional deployment of a SOA between the isolation region and the LD to enhance the gain of the direct modulated and transmitted 1550 nm signal.

OBJECTS OF THE INVENTION

It is an object of the present invention to provide for new and improved PIC chips to function as an OLT or ONU transceiver in a PON.

BRIEF SUMMARY OF THE INVENTION

According to this invention, a photonic integrated circuit (PIC) for a PON transceiver comprises a single monolithic chip having a modulated transmitter laser diode of a first wavelength, $\lambda_1$, for generating a first communication signal outgoing from the chip via an input/output port and a receiving photodetector for receiving a second communication signal of a second wavelength, $\lambda_2$, into the chip incoming from the input/output port and a monitoring photodetector for receiving a portion of the first communication signal to monitor the laser diode output power. In one embodiment, the chip is provided with multimode interference (MMI) coupler set to direct a substantial portion of the incoming communication signal to the receiving photodetector and to direct a substantial portion of the outgoing communication signal from the laser diode to the input/output port. A filter may be inserted before the receiving photodetector and/or the laser diode to extract any remaining and undesired signal to either such electro-optic elements. In another embodiment, the laser diode, power monitoring photodetector and the receiving photodetector are collinear in the same chip having a common waveguide where the power monitoring photodetector is capable of both monitoring power and insuring no backward reflecting light of the laser diode reaches the receiving photodiode through it absorption of such light. This is an important feature of this invention in that the active region of the power monitoring photodetector is made sensitive to absorption of polarized light of both the TE and TM polarization modes of this back reflected light that is unwanted noise propagating in and received from the passive optical network (PON).

Another feature of this a photonic integrated circuit for a PON transceiver, which may be either a OLT or an ONU depending upon the embodiment, comprising an input, an active optical element train comprising a transmitter laser emitting light at $\lambda_1$, a back facet monitoring photodetector/absorber and a receiver photodetector for receiving and detecting light at a wavelength $\lambda_2$ where $\lambda_2 > \lambda_1$, the back facet monitoring photodetector/absorber having an absorption length, $\alpha L$, long enough to absorb both the polarization mode emission from the laser at $\lambda_1$ as well as the orthogonal polarization light at $\lambda_1$ received at the circuit input so as not to reach the receiver photodetector. The transmitter laser and the back facet monitoring photodetector/absorber share the same active region or may have separate active regions and are evanescently coupled to one another. The absorption length, $L_2$, is determined by the relationship, $$L_{T1} = \frac{\alpha_{T2} L_{T2}}{\alpha_{T1}}$$

wherein $L_{T2}$ is the length required for sufficient absorption of the T2 mode received from the transmission fiber, $L_{T1}$ is the length required for sufficient absorption of the T1 mode from the laser, and $\alpha_{T1}$ and $\alpha_{T2}$ are absorption coefficients of the T1 and T2 modes, respectively. The T1 mode may be the TM mode and the T2 mode is then the TE mode where the transmitter laser operates in the TE mode; otherwise, the T1 mode may be the TE mode and then the T2 mode is the TM mode where the transmitter laser operates in the TM mode.

Another feature of this invention is the application of distributed or diluted waveguides in photonic integrated circuits to provide mode adapter functionality between active or passive elements in the circuit. Such a photonic integrated circuit may be comprised of a plurality of active elements formed in the circuit and providing for propagation of narrow modes through the elements and where at least some of the active elements are optically coupled to one another with a large distributed waveguide permitting propagation of larger mode comprising a superset of the narrow optical modes propagating through the optically coupled active elements so as to operate as a kind of mode adapter between or among the optically coupled active elements. Such a circuit may be employed as an optical transceiver. The active elements in such a circuit may be comprised of one or more of a laser diode, a photodetector, an optical amplifier and a variable optical attenuator.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts:

FIG. 1A is a schematic illustration of a basic tree type of passive optical network (PON) architecture.

FIG. 1B is a schematic illustration of a bus type of passive optical network (PON) architecture.

FIG. 1C is a schematic illustration of a trunk protected tree type of passive optical network (PON) architecture.

DETAILED DESCRIPTION OF THE INVENTION

Figure 1D:
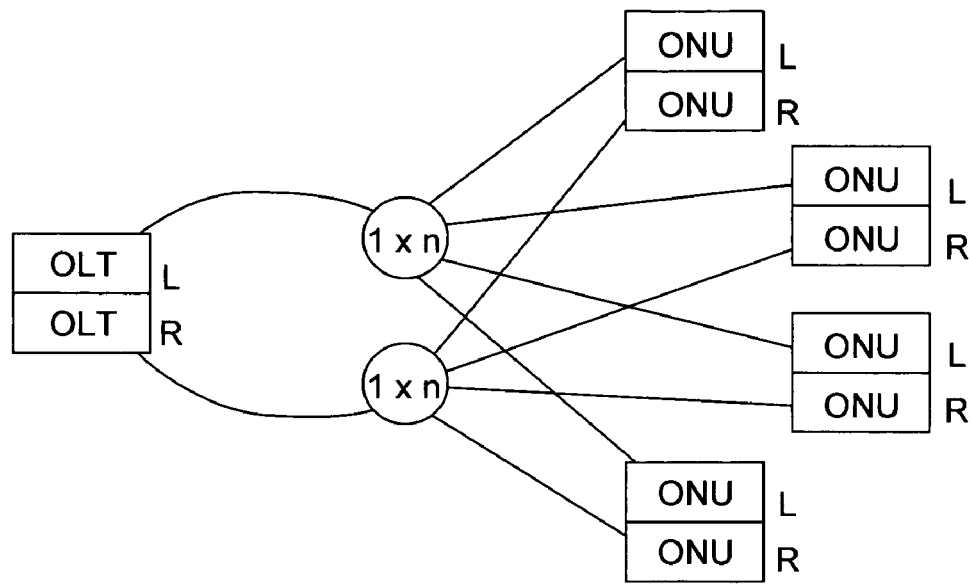
FIG. 1D is a schematic illustration of a fully redundant tree type of passive optical network (PON) architecture.
Figure 1E:
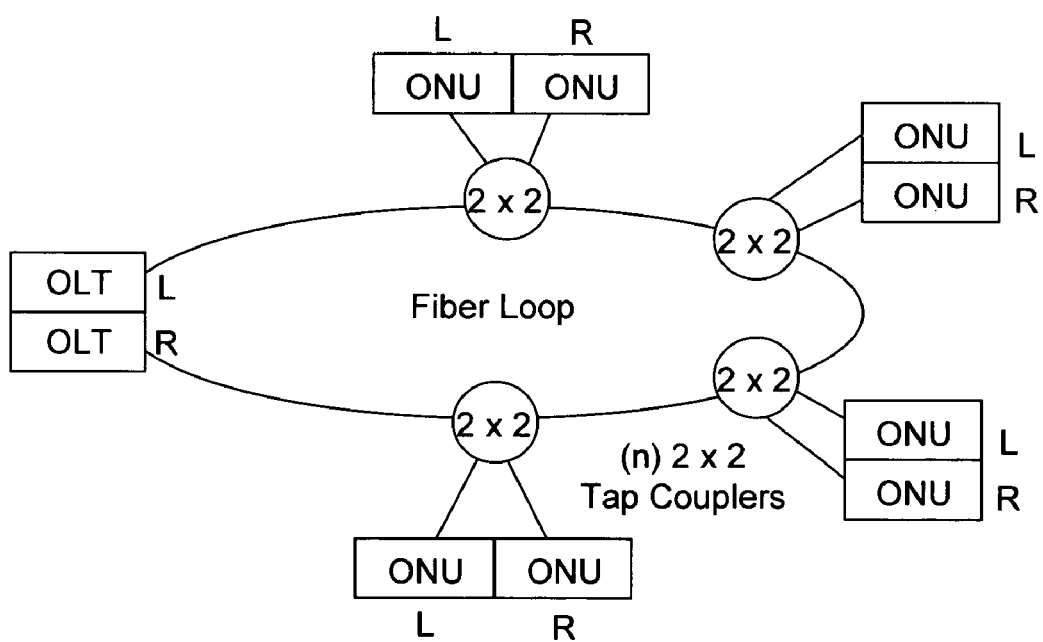
FIG. 1E is a schematic illustration of a fully redundant bus type of passive optical network (PON) architecture.
Figure 2:
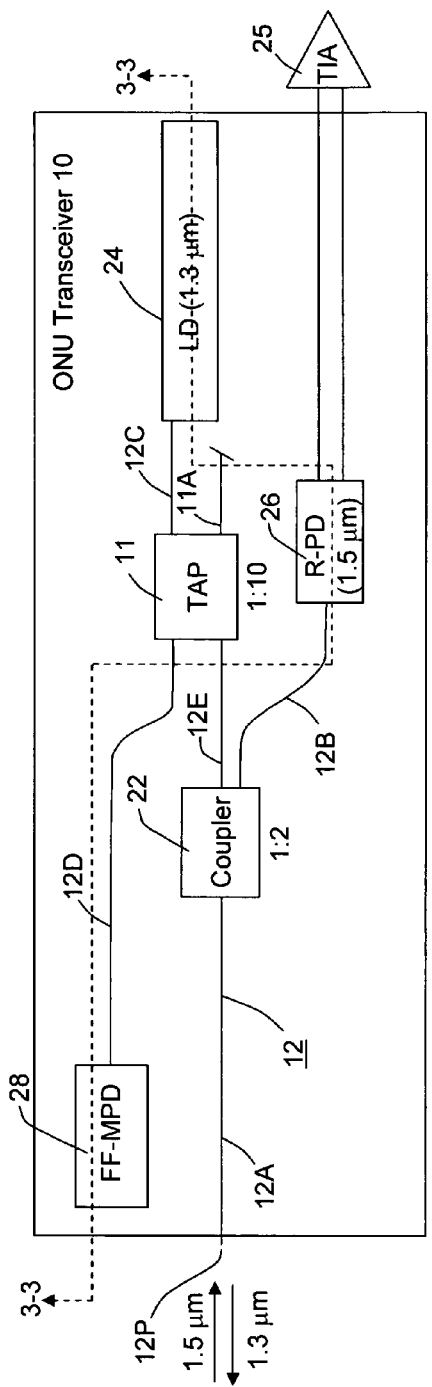
FIG. 2 is a schematic plan view of a first embodiment of this invention.
Figure 3:
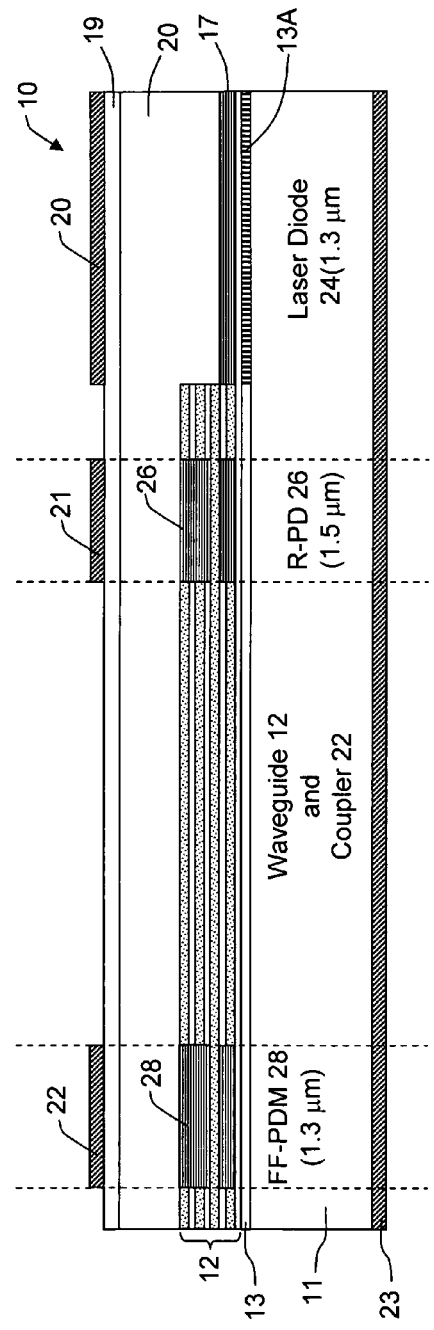
FIG. 3 is a longitudinal cross-section of the view shown in FIG. 1, taken along the line 3-3 of that figure.

Reference is now made to FIGS. 2 and 3 illustrating a first embodiment of this invention. The photonic integrated circuit (PIC) shown is an ONU transceiver chip 10 comprising a large or "fat" mode waveguide 12 including input/output waveguide 12A to an optical splitting coupler 22 which may be a multi-mode (MM) type coupler such as, for example, a multimode interference (MMI) coupler, a star coupler or a directional coupler. The principal construction and operation of such wavelength sensitive couplers, such as in the case of an MMI coupler, are disclosed in U.S. Pat. No. 5,689,597, U.S. patent application 2003/0174960, U.S. Pat. No. 4,484, 794 or U.S. Pat. No. 6,580,844, all of which are incorporated herein by their reference. See also, for example, the multi-mode coupler illustrated in FIG. 5(a) of U.S. Pat. No. 6,580, 844. Coupler 22 may also be a Y-branch coupler.

As previously indicated, the multi-mode interference principal is based on self-imaging where the input signal to the MM coupler is reproduced in single and multiple images along the multi-mode region of the coupler. The incoming light is split between at least two output waveguides having a n:m coupling ratio which is dependent upon the coupling length or self-imaging property as well as, in the case of a directional coupler, on the splitting ratio. Such a ratio here may be, for example, 1:2. Although more cost and complexity, coupler 22 can also be a wavelength selective coupler such as, for example, a Mach-Zehnder interferometer (MZI) or an arrayed waveguide grating (AWG). In the case of such wavelength independent couplers, the coupling ratio sets the amount of light that is transferred to either waveguide 12B and 12E of coupler 22. In the case of the wavelength dependent couplers, the light is separated according to peak wavelengths of the incoming lightwaves or wavelength signals.

Figure 4:
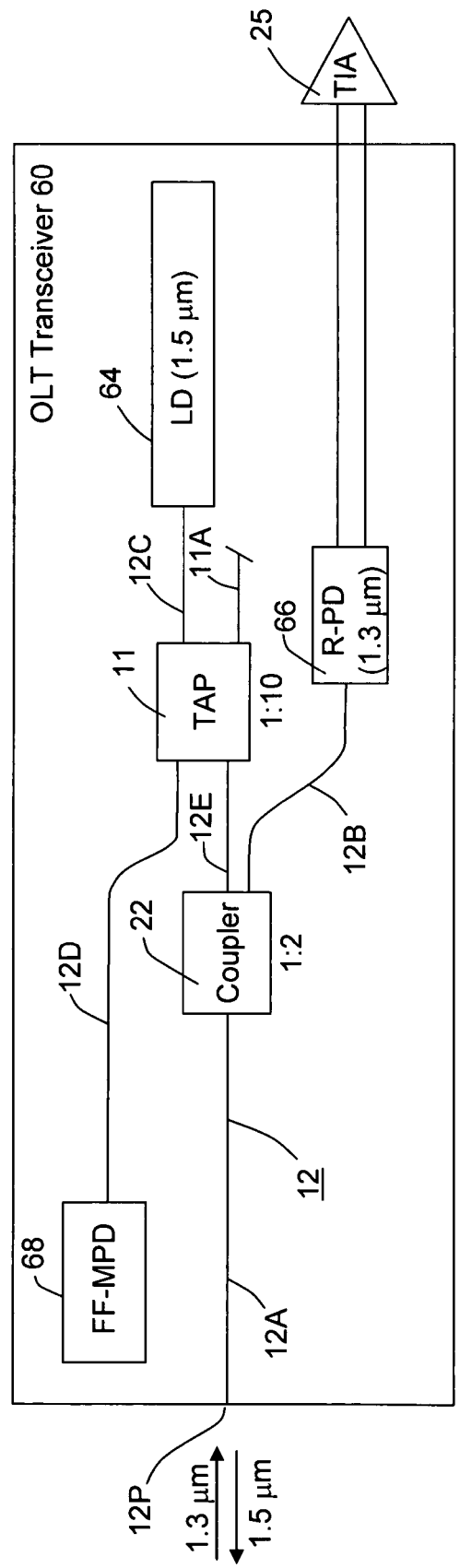
FIG. 4 is a schematic plan view of a second embodiment of this invention.

It is also within the scope of this invention to also employ a diffraction grating coupler as coupler 22 as seen, in principal, in FIG. 4 of U.S. Pat. No. 5,428,695, which patent is incorporated by reference. In this case, the elements comprising 1.3 µm laser diode (LD) 24 and 1.5 µm receiver photodetector (R-PD) 26 along with splitting coupler 22 are integrated on the same substrate where the integrated 1.3 µm LD 24 would be laser diode 61 in FIG. 4 of that patent and the 1.5 µm R-PD would be integrated with the output from channel 3b at fiber 7a of FIG. 4 of that patent. Coupler 22 would be the region of diffraction grating 5 of that patent.

In FIG. 2, coupler 22 may be a multi-mode (MM) type coupler where the n:m coupling ratio relative to multiple outputs, in particular two outputs to waveguides 12E; 12B, may be, for example, 1:10. In FIG. 2 the incoming signal from a network OLT is a 1.5 µm, e.g., a 1550 nm communication signal, is coupled into input/output waveguide 12A to coupler 22 with a ratio split, for example, of 1:10 with a substantial amount of a 1550 nm signal directed, via waveguide 12B, to 1.5 µm signal receiver photodetector (R-PD) 26 for detection, producing a photocurrent which is connected to transimpedance amplifier (TIA) 25. The other split light along waveguide 12E comprises a smaller amount (1:2) and is directed on output 12E to 1.3 µm laser diode (LD) 24 via tap or splitting coupler 11 which has a splitting ration of 1:10. As a result, most of this residual 1.5 ∞m light is split off at output port 11A of tap 11. It should be noted, however, that this fractional 1.5 µm light, being of a longer wavelength than the LD output of 1.5 µm, does not interfere with and is nonabsorbent or transparent to the operation of 1.3 µm LD 24. If a wavelength selective type of coupler were employed for coupler 22, this 1.5 µm light would be even a smaller fraction of the light on output 12E. Direct modulated LD 24 is, for example, a 1310 nm transmitter laser that provides a modulated signal to an OLT to the PON via tap 11 and coupler 22 and input/output waveguide 12A to chip output port 12P. A 1.3 µm monitoring photodetector (MPD) 28 is also coupled via tap 11 and waveguide 12D to receive a small portion of the modulated output signal from LD 24 for purposes of monitoring the output power of LD 26 from its front facet (FF) output. Thus, the larger part of the modulated output from laser 24 is provided to output 12E of tap 11 while a smaller portion (1%) is provided to front facet monitoring photodiode (FF-MPD) 28. R-PD 26 and FF-MPD 28 may be either a PIN photodiode or an avalanche photodiode as known in the art.

FIG. 3 illustrates a cross-sectional view of the general epitaxial structure for transceiver chip 10 in FIG. 2 and comprises an InP substrate, such as n⁺-doped substrate, upon which is deposited, as a first epitaxial step, a grating layer 13 such as comprising InGaAsP, for example. Then, a DFB laser grating 13A is formed in the region of LD 24. This grating has a period that sets the operating wavelength of DFB LD 24 at 1310 nm, for example. This is followed by a second epitaxial growth step comprising the deposition of active region 17 comprising multiple alternating layers of quantum wells and barriers comprising either InGaAsP or AlInGaAs which layers may be sandwiched by cladding layers. After the grow of active region 17, an etchback is performed in regions other than regions of LD 24 and PDs 26 and 29, to wit, waveguide regions 12 and coupler region 22, which is followed by the epitaxial grow of a large (fat) mode or distributed (diluted) waveguide 12. Waveguide 12 is the principal waveguide for ONU transceiver 10 and functions like a natural mode adapter to transform the propagating light from a large mode to narrow mode regions of active elements, i.e., LD 24 and PDs 26 and 28. This type of large mode waveguide structure minimizes interface losses between these active elements where such losses would be higher if a narrow mode waveguide were utilized. Distributed waveguide 12 which may be comprised of alternating layers, for example, of InGaAsP and InP.

Thus, diluted waveguide 12 functions principally as a low cost mode adapter being a superset of other narrower modes. This is not the traditional mode adapter as known in the art, which require one or more etch and regrowth steps rendering the cost of the chip to be higher, but functions like an inexpensive ("poor man's") mode adaptor by providing a practical compromise which allows adaptation of modes especially when the waveguide mode is a superset of all the other modes of the on-chip active elements and, therefore, provides for an easy mode transformation without complicated mode adapter fabrication to accomplish the same function.

Next, the PDs 26 and 28 are formed as part of or above waveguide 12 and respectively have epitaxially grown absorption layers with a 1.5 µm and 1.3 µm bandgap, respectively. The final growth step is the epitaxial growth of the cladding layer 18 of InP and contact layer 19 InGaAs over previously as-grown regions. Lastly, a selective etch may be performed forming a ridge-type waveguide 12 comprising waveguide sections 12A, 12B, 12C, 12D, and 12E and their associated active and passive elements. Current biasing electrodes 20, 21, 22 and common electrode 23 are applied as shown.

It is within the scope of this invention to utilize in circuit 10 other active electro-optic components such as a semiconductor amplifier (SOA) or a variable optical attenuator (VOA) such as in waveguide 12A or other waveguides in the circuit.

The geometry of transceiver 10 of FIGS. 2 and 3 may be also utilized as an OLT transceiver 60, a plan view of which is shown in FIG. 4. Here, the epitaxial process is similar to that for transceiver 10 except that laser diode or LD 64 and FF-MPD 68 are epitaxially grown with a 1.5 µm bandgap active region and R-PD 66 is grown with an epitaxially grown 1.3 µm bandgap active region. Also, in this case any small portion of 1.3 µm light on waveguide 12C to 1.5 µm LD 64 should be minimized. In this embodiment, a wavelength selective coupler or a diffraction coupler may be more preferred for coupler 22 for this purpose. Also, tap 11 provides the important function of directing 1.3 µm light on tap input 12E to be directed out of the tap 11 through its output 11A; otherwise, this light would interfere with the operation of the 1.5 µm laser diode (LD) 64.

Figure 5:
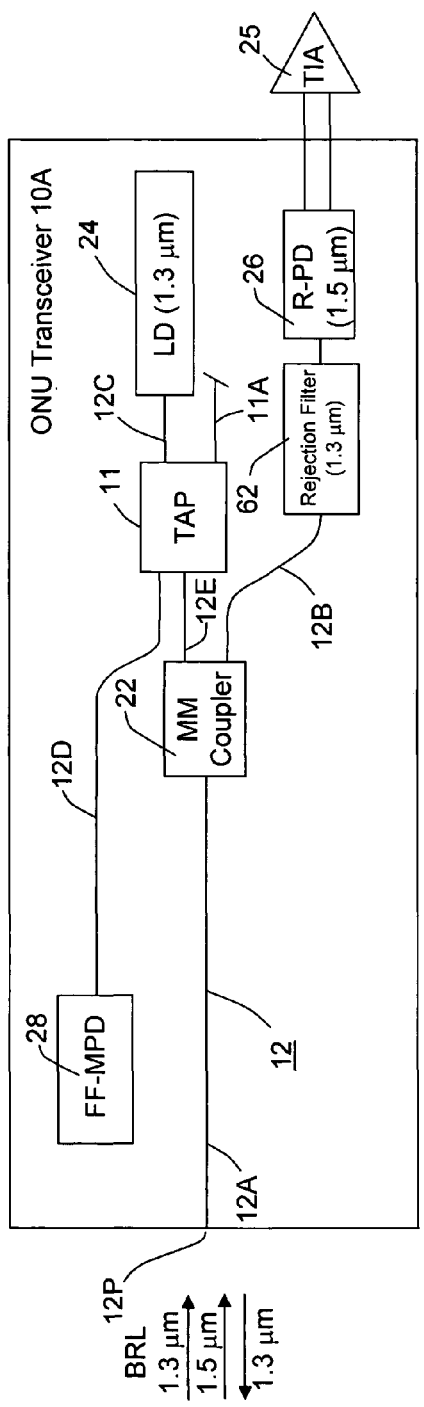
FIG. 5 is a first modified embodiment of the first embodiment shown in FIGS. 2 and 3.

FIG. 5 illustrates an alternative embodiment of transceiver 10 of FIGS. 2 and 3 comprising transceiver 10A which is the same as transceiver 10 except that it includes a 1.3 µm rejection filter 62 in waveguide 12B to filter out any 1.3 µm signal back reflection into chip 10A from interfering with the detection operation performance of R-PD 26. Rejection filter 62 may be a Bragg grating or a blazed grating with a period set at 1.3 µm. Alternatively, filter 62 may be a 1:N coupler where the 1310 nm back reflected light (BRL) is set to a dead-end coupler output in a manner similar to dead-end coupler output 11A.

Figure 6:
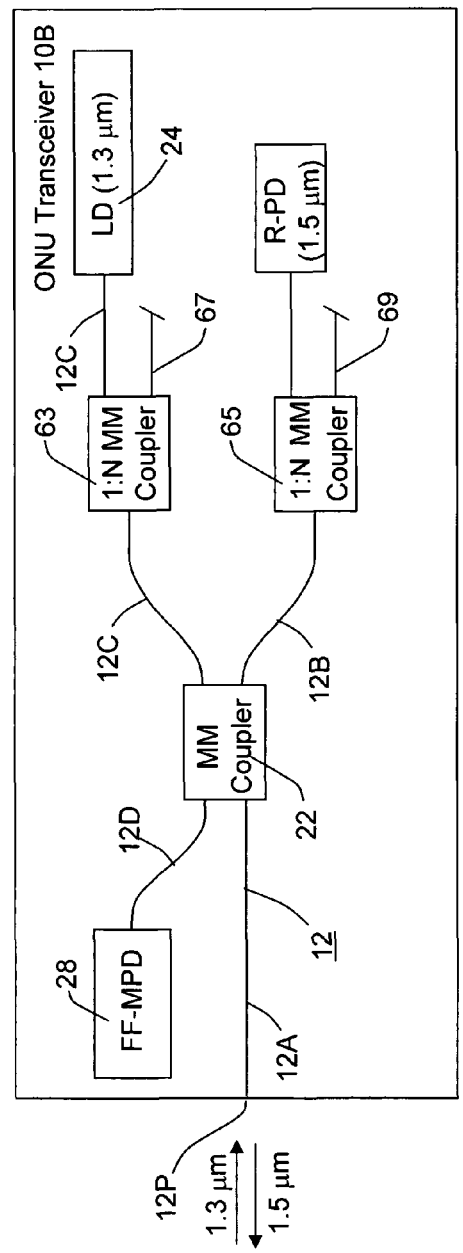
FIG. 6 is a second modified embodiment of the first embodiment shown in FIGS. 2 and 3.

FIG. 6 illustrates a further alternative embodiment of transceiver 10 of FIGS. 2 and 3 comprising transceiver 10B which includes in respective waveguide sections 12C and 12B, a 1:N MM coupler 63 and 65. These couplers 63 and 65 have their splitting ratios design to respectively couple out on dead-end outputs 67 and 69 the residual 1550 nm signal and the residual 1310 nm signal, respectively, in the coupler in a manner, for example, as explained relative to FIGS. 3A, 3B and 5(a) in U.S. Pat. No. 6,580,844. Thus, the embodiments of FIGS. 5 and 6 illustrate alternative embodiments for substantial removal of unwanted signals from either or both waveguide 12B or 12C.

Figure 7:
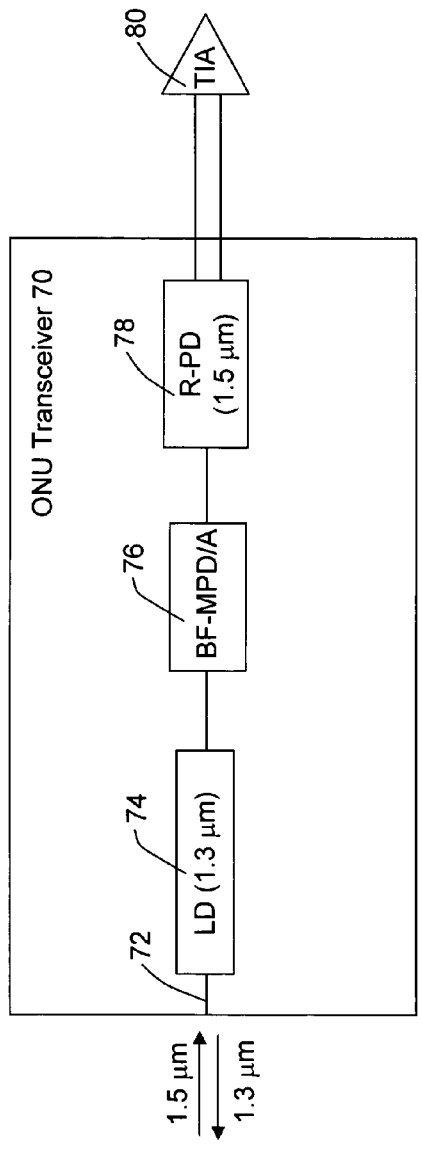
FIG. 7 is a schematic plan view of a third embodiment of this invention.
Figure 8:
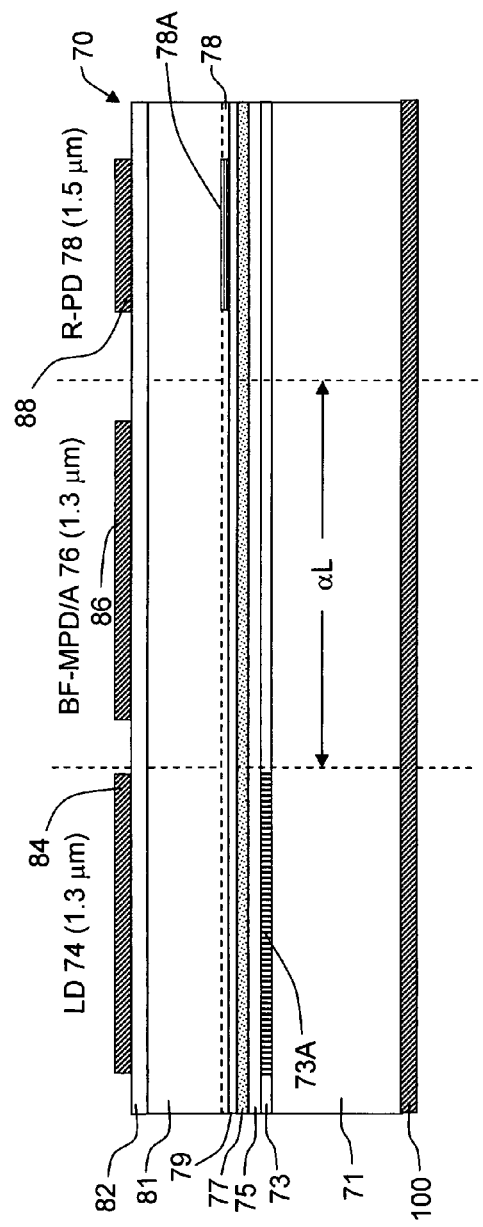
FIG. 8 is a longitudinal cross-section of the view shown in FIG. 7.

FIGS. 7 and 8 illustrate a third embodiment of this invention for an ONU transceiver. Transceiver 70 is similar in basic fundamentals to the transceiver shown in U.S. Pat. No. 5,031,188 to Koch et al. except that the construction of transceiver 70 here is importantly different. Transceiver 70 includes an inline electro-optic element train, starting at input/output waveguide 72, a 1.3 µm laser diode (LD) 74, a back-facet monitoring photodetector/absorber (BF-MPD/A) 76 that monitors back propagating light from laser diode (LD) 74 as well as functioning as a substantially complete absorber of back-propagating 1310 nm light from LD 74 so as not to interfere with the performance of receiver photodetector (R-PD) 78, which is the last electro-optic element in the on-chip, electro-optic element train. The generated photocurrent output of R-PD 78 is coupled to a transimpedance amplifier (TIA) 80. Thus, back-facet monitoring photodetector/Absorber (BF-MPD/A) 76 performs a dual function of both monitoring the power of LD 74 as well as absorbing any back reflected light from adjacent laser diode 74 as well as noise from other transmitting laser diodes 74 coupled to the same passive optical network (PON) (or even from other networks) or back reflected 1.3 µm light from the network that comes into ONU transceiver 70. Such light on the transmission fiber coming back to transceiver 70 is likely TM mode light. Most laser diodes are designed such that they predominately emit light is in the TE mode but, as known to those skilled in the art, the laser could be designed to emit TM mode light if desired. However, this TE mode light propagating on the transmission fiber from another source or as back reflected light returns as TM mode light because the polarized light rotates as it traverses the fiber in a well known continuous conversion process. In order to absorb this 1.3 µm TM mode light, the absorber 76 must be designed to efficiently absorb TM mode light as well as TE mode light. Thus, in order for BF/MPD/A 76 to optimally operate to efficiently absorb both TE and TM modes, the absorption region of absorber 76 must be sufficiently long to absorb both the TM mode light as well as the TE light. In other words, its absorption length, αL, must be longer than that required to absorb TE mode light from laser 74 in order to also efficiently absorb also back reflected or other transmitted TM mode light received from the transmission fiber. The absorption length, L, for the TM mode or $L_{TM}$ should be:

$$L_{TM} = \frac{\alpha_{TE} L_{TE}}{\alpha_{TM}} \quad (1)$$

where $L_{TM}$ and $L_{TE}$ are the total lengths required for substantially complete absorption and $\alpha_{TM}$ and $\alpha_{TE}$ are the absorption coefficients on the material relating to the amount of light absorbed per unit length.

Thus, the absorption region needs to be several times longer, such as 2 to 10 times longer, to absorb the TM mode as well as the TE mode where a TE mode laser 74 is present. The opposite is true in the case of TM mode laser. The point is that one needs to be aware of the opposite polarization and provide a sufficiently long absorption region at absorber 76 to effectively absorb both the TE and TM mode of 1.3 μm light from reaching the 1.5 μm receiver PD 78 and affecting its proper detection of an incoming 1.5 μm signal. Thus, the above formula for both polarization mode situations is:

$$L_{T1} = \frac{\alpha_{T2} L_{T2}}{\alpha_{T1}} \quad (2)$$

where T1 is TM mode or TE mode where, respectively, T2 is TE mode or TM mode.

As seen in FIG. 8, the epitaxial growth of transceiver chip 70 is as follows. On InP substrate 71, a buffer layer (not shown) is epitaxially grown followed by a grating layer 73. This completes the first epitaxial growth step. Next, grating 73A is formed in the region of the yet-to-formed laser diode (LD) 74 having a grating period to provide feedback for generation of a 1310 nm wavelength in LD 74. This is then followed by a second epitaxial growth step comprising separation or space layer 75 of InP, laser active region 77 comprising multiple quantum well layers and barriers of InGaAsP or AlInGaAs, followed by separation layer 79 of InP, and then followed by growth of a 1.5 μm absorption layer 78 for R-PD 78, for example, comprising InGaAs. This completes the second epitaxial growth. Layer 78 is etched away except in the region at 78A of R-PD 78 where layer portion 78A of previously deposited layer 78 constitutes the absorption layer for R-PD 78. Then, the third and final epitaxial growth is commenced comprising a p-InP cladding layer 81 followed by a p⁺-InGaAs contact layer 82. Three electrodes 84, 86 and 88 are provided for respectively driving or biasing LD 74, BF-MPD/Absorber 76 and R-PD 78 and the common electrode 100 is provided on the bottom of substrate 71. The ONU transceiver 70 is formed as an inline-element, ridge waveguide for light confinement and waveguiding through etching to form the ridge waveguide.

An important feature of the embodiment shown in FIGS. 7 and 8 over similar devices in the art is the deployment of BF-MPD/Absorber 76 which absorbs not only backward reflected light from transmitter DL 74 but also absorbs back reflected light accompanying the incoming 1.5 μm signal which is noise generated, for example, from other nodes or other ONU 1.3 μm transmitting devices on the same passive network. The absorption of BF-MPD/absorber 76 is sufficiently broad to absorb noise accompanying the incoming 1.5 μm signal as well as noise or turn-on electrical spikes generated from other networks 1.3 μm sources and appearing at input 72. A specific example of such back reflecting light is from another passive network ONU 70 on power startup of its transmitting laser 74 transmitting a spike signal that is received by other ONUs 70 on the same network. BF-MPD/Absorber 76 can filter out these types of noise transmissions.

As an alternative embodiment, the BF-MPD/Absorber 76 may also have an active region comprising a well/barrier structure where compressive wells and strained barriers produce an overall strain balance for absorption of both the TE and TM modes so that backward propagating 1.3 μm light in either mode will be equally and completely absorbed. See, for example, pages 177-179 of Chapter 5 of the book entitled, "*Optical Fiber Telecommunications IIIB*", edited by Ivan P. Kaminow and Thomas L. Koch, Academic Press (1997), which book pages are incorporated herein by this reference.

Figure 9:
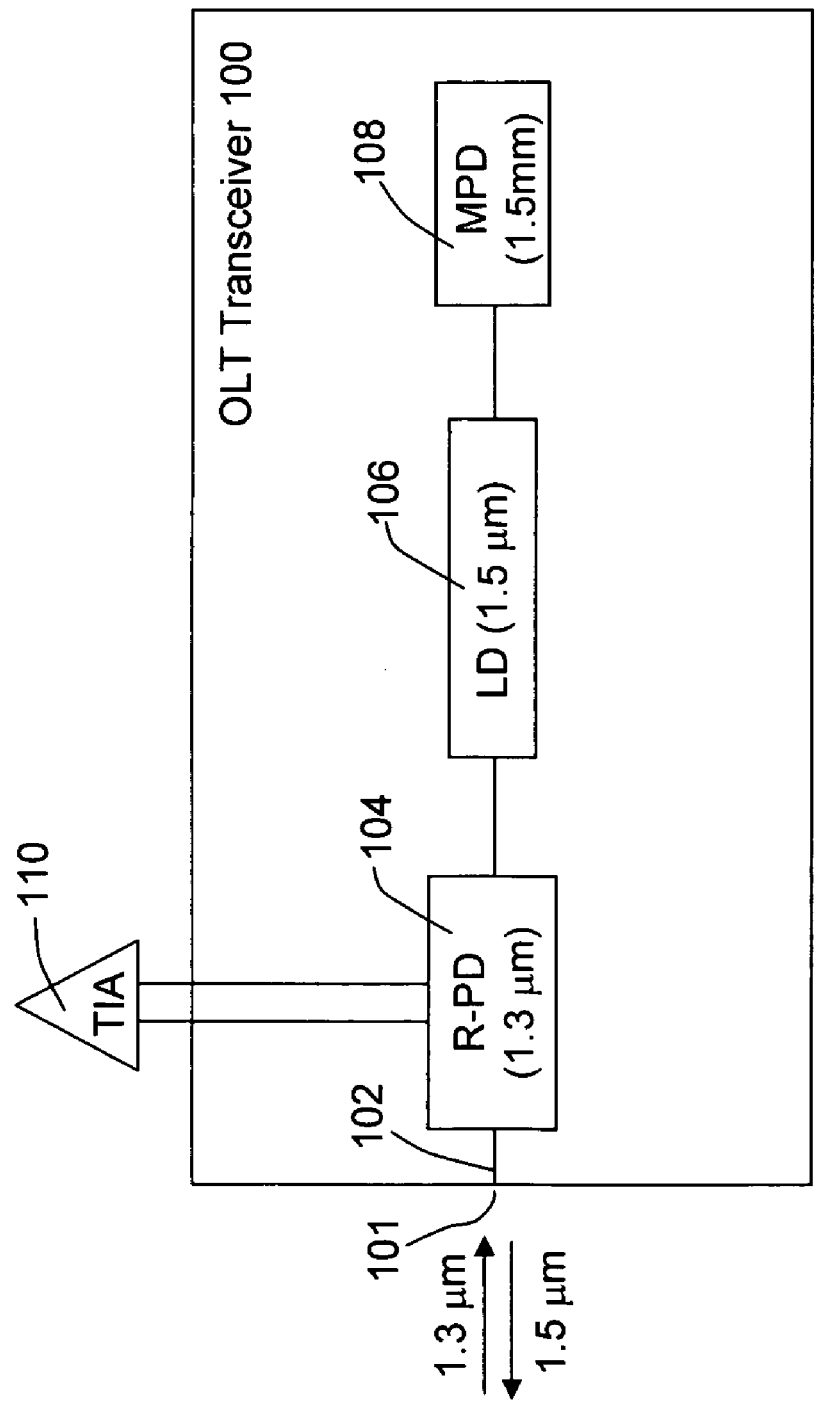
FIG. 9 is a schematic plan view of a fourth embodiment of the invention.

FIG. 9 illustrates a fourth embodiment of this invention comprising an OLT transceiver 100 formed or integrated on a single PIC and comprising an input/output 101 and input/output waveguide 102 coupled to a train of active or electro-optic elements 104 106 and 108. The first element 104 is a receiver photodetector (R-PD) at, for example, 1.3 μm which receives an incoming 1.3 μm signal from the connected PON from an ONU connected to the same PON, such as ONU 70 in FIGS. 7 and 8. R-PD 104 converts the 1.3 μm optical signal into a photocurrent which is converted to an analog voltage signal by TIA 110. Element 106 is a laser diode, for example, a DFB laser at 1.5 μm active region which is direct modulated to produce a 1.5 μm modulated signal at input/output 101 onto the PON. The modulated signal from laser diode 106 is transparent as it passes through R-PD 104 to input/output 101. The last element in the train of elements is back facet monitoring photodetector (MPD) 108 to monitor the power and/or wavelength of laser diode 106. This OLT transceiver chip 100 may be InP-based chip as in the case of all of the preceding embodiments.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A photonic integrated circuit, comprising:
   a substrate;
   a plurality of semiconductor layers provided on the substrate;
   a waveguide provided on the substrate;
   an input/output port;
   an optical coupler having first, second, and third ports, the coupler including a first portion of one of the plurality of semiconductor layers, the waveguide being coupled to the input/output port and the first port of the optical coupler;
   a laser diode that provides an outgoing signal at a first wavelength to the second port of the coupler; and
   a photodiode coupled to the third port of the optical coupler, said one of the plurality of semiconductor layers extending continuously from the first portion into the photodiode, such that the photodiode includes a second portion of said one of the plurality of semiconductor layers,
   wherein the optical coupler has a coupling length and a splitting ratio such that a substantial portion of an incoming signal at a second wavelength is directed to said third port of the optical coupler and passed to the photodiode, and a substantial portion of the outgoing signal is directed to the first port of the optical coupler and passed to the input/output port.

2. The photonic integrated circuit of claim 1, wherein the photodiode is a first photodiode, the photonic integrated circuit further comprising a second photodiode that receives a portion of said outgoing signal at the first wavelength.

3. The photonic integrated circuit of claim 1, wherein said optical coupler is a multi-mode interference coupler.

4. The photonic integrated circuit of claim 1, further comprising a filter provided between said coupler and said photodiode.

5. The photonic integrated circuit of claim 4, wherein said filter is a Bragg grating, an MMI coupler or a blazed grating.

6. The photonic integrated circuit of claim 1, further comprising a filter provided between said coupler and said laser diode.

7. The photonic integrated circuit of claim 6, wherein said filter is a Bragg grating, an MMI coupler or a blazed grating.

8. The photonic integrated circuit of claim 1, wherein said first wavelength is 1310 nm and said second wavelength is 1550 nm.

9. The photonic integrated circuit of claim 1, wherein said optical coupler is a directional coupler.

10. A photonic integrated circuit, comprising:
a substrate;
a plurality of semiconductor layers provided on the substrate;
a waveguide provided on the substrate;
an input/output port;
an optical coupler having first, second, and third ports, the coupler including a first portion of one of the plurality of semiconductor layers, the waveguide being coupled to the input/output port and the first port of the optical coupler;
a laser diode having first and second facets, the laser diode providing an outgoing signal at a first wavelength through the first facet to the second port of the coupler;
a first photodiode configured to sense light output from the second facet of the laser diode; and
a second photodiode coupled to the third port of the optical coupler, said one of the plurality of semiconductor layers extending continuously from the first portion into the second photodiode, such that the second photodiode includes a second portion of said one of the plurality of semiconductor layers,
wherein the optical coupler has a coupling length and a splitting ratio such that a substantial portion of an incoming signal at a second wavelength is directed to said third port of the optical coupler and passed to the photodiode, and a substantial portion of the outgoing signal is directed to the first port of the optical coupler and passed to the input/output port.

11. The photonic integrated circuit of claim 10, wherein an active region of said second photodiode comprises a plurality of compressive quantum wells and strained barriers.

12. The photonic integrated circuit of claim 10 wherein said first wavelength is 1.3 μm and said second wavelength is 1.5 μm.

* * * * *